US012725094B2

(12) United States Patent
Kloepper et al.

(10) Patent No.: US 12,725,094 B2
(45) Date of Patent: Sep. 1, 2026

(54) DATA PROCESSING FOR INDUSTRIAL MACHINE LEARNING

(71) Applicant: ABB Schweiz AG, Baden (CH)

(72) Inventors: Benjamin Kloepper, Mannheim (DE); Benedikt Schmidt, Heidelberg (DE); Ido Amihai, Heppenheim (DE); Moncef Chioua, Montreal (CA); Jan Christoph Schlake, Darmstadt (DE); Arzam Muzaffar Kotriwala, Ladenburg (DE); Martin Hollender, Dossenheim (DE); Dennis Janka, Heidelberg (DE); Felix Lenders, Darmstadt (DE); Hadil Abukwaik, Weinheim (DE)

(73) Assignee: ABB Schweiz AG, Baden (CH)

( * ) Notice: Subject to any disclaimer, the term of this patent is extended or adjusted under 35 U.S.C. 154(b) by 944 days.

(21) Appl. No.: 17/956,117

(22) Filed: Sep. 29, 2022

(65) Prior Publication Data

US 2023/0019404 A1 Jan. 19, 2023

Related U.S. Application Data

(63) Continuation of application No. PCT/EP2021/056093, filed on Mar. 10, 2021, which
(Continued)

(51) Int. Cl.
*G06N 20/20* (2019.01)
*G06N 20/10* (2019.01)

(52) U.S. Cl.
CPC ............ *G06N 20/20* (2019.01); *G06N 20/10* (2019.01)

(58) Field of Classification Search
CPC ........ G06N 20/20; G06N 20/00; G06N 20/10; G06N 3/044; G06N 3/0455; G06N 3/08;
(Continued)

(56) References Cited

U.S. PATENT DOCUMENTS 7,391,821 B2 * 6/2008 Hu .......................... H04B 1/04
714/E11.204
10,474,956 B2 * 11/2019 Li .......................... G06N 7/01
(Continued)

FOREIGN PATENT DOCUMENTS

CA 3055187 A1 * 9/2018 ............ G16H 50/20
CN 105956077 A 9/2016
(Continued)

OTHER PUBLICATIONS

Atzmueller et al., "Explanation-Aware Feature Selection using Symbolic Time Series Abstraction: Approaches and Experiences in a Petro-Chemical Production Context," *2017 IEEE 15th International Conference on Industrial Informatics* (*INDIN*), IEEE, 6 pp. (Jul. 24-26, 2017).
(Continued)

*Primary Examiner* — Steven P Sax
(74) *Attorney, Agent, or Firm* — Fitch Even Tabin & Flannery LLP

(57) ABSTRACT

A computer-implemented method for automating the development of industrial machine learning applications includes one or more sub-methods that, depending on the industrial machine learning problem, may be executed iteratively. These sub-methods include at least one of a method to automate the data cleaning in training and later application of machine learning models, a method to label time series (in particular signal data) with help of other timestamp records,
(Continued)

feature engineering with the help of process mining, and automated hyper-parameter tuning for data segmentation and classification.

13 Claims, 7 Drawing Sheets

Related U.S. Application Data is a continuation of application No. PCT/EP2020/059135, filed on Mar. 31, 2020.

(58) Field of Classification Search
CPC .......... G06N 5/01; G16H 50/20; G01C 21/26; H04L 43/67; H04L 63/1425; H04L 43/16; G06F 30/20; G06F 2119/02; F04D 17/00; G05B 23/0205; H02J 3/38
See application file for complete search history.

(56) References Cited

U.S. PATENT DOCUMENTS

| | | | | |
|---|---|---|---|---|
| 10,769,909 | B1 * | 9/2020 | Modestine | G06V 20/52 |
| 11,113,048 | B1 * | 9/2021 | Tanniru | G06F 40/30 |
| 11,258,825 | B1 * | 2/2022 | Yang | G06N 20/00 |
| 11,314,561 | B2 * | 4/2022 | Copier | G06F 9/524 |
| 11,551,103 | B2 * | 1/2023 | Cook | G06N 20/00 |
| 11,768,996 | B2 * | 9/2023 | Saripalli | G06F 40/151 715/234 |
| 2015/0227838 | A1 * | 8/2015 | Wang | G16H 40/40 706/12 |
| 2016/0104093 | A1 * | 4/2016 | Fletcher | G06Q 10/06393 705/7.39 |
| 2017/0006914 | A1 * | 1/2017 | Birchler | H04L 67/1095 |
| 2018/0275667 | A1 * | 9/2018 | Liu | G01C 21/26 |
| 2018/0307713 | A1 | 10/2018 | Shin et al. | |
| 2019/0065053 | A1 * | 2/2019 | Eads | G06F 3/065 |
| 2020/0184278 | A1 * | 6/2020 | Zadeh | G06N 3/044 |
| 2020/0201950 | A1 * | 6/2020 | Wang | F03D 17/00 |
| 2021/0038163 | A1 * | 2/2021 | Agrawal | G16H 50/20 |
| 2021/0264332 | A1 * | 8/2021 | Pingali | G06N 3/04 |
| 2022/0206878 | A1 * | 6/2022 | Copier | G06Q 20/405 |
| 2025/0225368 | A1 * | 7/2025 | Nguyen | G06N 3/084 |

FOREIGN PATENT DOCUMENTS

| | | | | |
|---|---|---|---|---|
| CN | 107666410 A * | 2/2018 | G06F 30/18 |
| CN | 109492772 A | 3/2019 | |
| CN | 109784249 A * | 5/2019 | |
| EP | 3798911 A1 * | 3/2021 | G06N 20/00 |
| EP | 3902992 B1 * | 1/2024 | G06F 30/20 |
| JP | 8-202444 A | 8/1996 | |
| JP | 2011-145846 A | 7/2011 | |
| JP | 2013-041448 A | 2/2013 | |
| JP | 2014-096050 A | 5/2014 | |
| JP | 2020-027424 A | 2/2020 | |
| KR | 20210115991 A * | 9/2021 | G06N 3/0455 |
| WO | WO 2014/043623 A1 | 3/2014 | |
| WO | WO 2020/059099 A1 | 3/2020 | |

OTHER PUBLICATIONS

Badakhshan et al., "The Action Engine—Turning Process Insights into Action," *ICPM Demos*, 4 pp. (2019).

Berti, "Process Mining on Event Graphs: a Framework to Extensively Support Projects," *BPM* (*PhD/Demos*), 6 pp. (2019).

Osman et al., "When Industry 4.0 meets Process Mining," *Procedia computer science*, 159: 2130-2136 (2019).

Tax et al., "Event Abstraction for Process Mining using Supervised Learning Techniques," *Proceedings of SAI Intelligent Systems Conference* (*IntelliSys*), IEEE, 10 pp. (Sep. 20-22, 2016).

Veit et al., "The Proactive Insights Engine: Process Mining meets Machine Learning and Artificial Intelligence," *15th International Conference on Business Process Management 2017* (*BPM*), Demo Sessions, 5 pp. (Sep. 2017).

European Patent Office, International Search Report in International Patent Application No. PCT/EP2021/056093, 4 pp. (Jun. 8, 2021).

European Patent Office, Written Opinion in International Patent Application No. PCT/EP2021/056093, 5 pp. (Jun. 8, 2021).

Rozinat, "How to Perform a Bottleneck Analysis With Process Mining," webpage, downloaded from the Internet on Apr. 4, 2025, at: https://fluxicon.com/blog/2017/01/how-to-perform-a-bottleneck-analysis-with-process-mining/, 5 pp. (Jan. 19, 2017).

Canadian Intellectual Property Office, Office Action in Canadian Patent Application No. 3,173,398, 6 pp. (Mar. 17, 2025).

Cai et al., "A Real-Time Trace-Level Root-Cause Diagnosis System in Alibaba Datacenters," *IEEE Access*, 7: 12 pp. (Oct. 11, 2019).

Wei et al., "Anomaly Prediction Approach in Business Process Based on Machine Learning," *Computer Integrated Manufacturing Systems*, 25(4): 864-872 (Apr. 30, 2019).

China National Intellectual Property Administration, Office Action in Chinese Patent Application No. 202180026316.6, 11 pp. (Aug. 28, 2025).

European Patent Office, Office Action in European Patent Application No. 21710006.4, 10 pp. (Oct. 16, 2025).

* cited by examiner

DATA PROCESSING FOR INDUSTRIAL MACHINE LEARNING

CROSS-REFERENCE TO RELATED APPLICATIONS

This patent application claims priority to International Patent Application No. PCT/EP2021/056093, filed on Mar. 10, 2021, and to International Patent Application No. PCT/EP2020/059135, filed on Mar. 31, 2020, each of which is incorporated herein in its entirety by reference.

FIELD OF THE DISCLOSURE

The present disclosure relates to a computer-implemented method for data preprocessing for industrial machine learning and, more particularly, to a method that be utilized, for example, for predictive maintenance, process monitoring, event prediction, or root-cause analysis.

BACKGROUND OF THE INVENTION

Machine learning can be used in industry, among others, for predictive maintenance, process monitoring, event prediction, or root-cause analysis. For example, in the case of predictive maintenance, the condition of an industrial asset such as a motor or a robot may be predicted in order to estimate the time when maintenance actions should be performed. Thus, maintenance actions may be scheduled depending on machine learning based predictions of the condition of the industrial asset.

This provides cost savings over time-based preventive maintenance, because maintenance actions are performed only when required. Furthermore, the probability of an unexpected failure of the industrial asset is reduced, since the condition of the asset is monitored continuously.

However, applying machine learning approaches for predictive maintenance is not a trivial task. In particular, the data from a sensor of an industrial asset or from a control system of an industrial process or plant typically needs to be preprocessed before application of the machine learning model. This preprocessing may comprise, for example, the cleaning of raw sensor data, including for instance the removal of outliers and/or the suppression of noise. Furthermore, the preprocessing typically involves the derivation of features from a time series of data. These preprocessing algorithms are critical for the performance that can be achieved by the machine learning model. Another critical requirement is the provision of a sufficient number of training samples for the training of the machine learning model.

Machine learning applications for predictive maintenance, but also for other objectives such as process monitoring, event prediction, or root-cause analysis are therefore developed by mixed teams of domain and machine learning experts.

BRIEF SUMMARY OF THE INVENTION

Machine learning and data science experts are rare and often lack the domain expertise required for industrial machine learning. Moreover, the development of industrial machine learning applications is a time-consuming process. Especially the time required for manual data cleaning, feature engineering, data labeling, and hyperparameter tuning is long. There is a lack of automated methods that enable domain experts to develop machine learning applications by themselves.

Existing approaches for supporting domain experts in developing machine learning applications such as automated machine learning (AutoML) leverage the homogenous character of mainstream machine learning applications like machine learning on tabular, textual, or image data. These approaches rely on the availability of labeled data to establish an objective function for model selection and hyperparameter tuning. However, such labeled data is usually not available in industrial machine learning applications.

It may therefore be desirable to provide an improved automation for the development of industrial machine learning applications.

The method for the automated development of industrial machine learning applications in accordance with the disclosure includes one or more sub-methods that, depending on the industrial machine learning problem, may be executed iteratively. Sub-methods may be (a) a method to automate the data cleaning in training and later application of machine learning models, (b) a method to label a time series of data such as a sensor signal using other timestamp records, (c) feature engineering with the help of process mining, and (d) automated hyper-parameter tuning for data segmentation and classification.

According to a first aspect of the present disclosure, a computer-implemented method for machine learning is presented. The method comprises acquiring a first time series of data from a sensor of an industrial asset or from a control system for an industrial process or plant. Furthermore, the method comprises processing the first time series of data to obtain an event log and applying process mining to the event log to provide a conformity analysis and/or bottleneck identification.

The first time series of data may be a discrete-time signal from a sensor of an industrial asset such as a motor or robot, or from a control system for an industrial process or plant such as a computerized distributed or centralized control system. Acquiring the first time series of data may mean, for example, to receive the first time series of data from the sensor or the control system, or to load the first time series from a storage medium. For example, the first time series of data may be loaded from a server such as a remote server. The first time series of data may comprise raw data from a sensor or from a control system, or the first time series of data may be processed data, e.g. a cleaned time series of data.

The steps of acquiring the first time series of data, processing the first time series of data, and applying process mining may be pre-processing steps, that may be executed before training or applying a first machine learning model, wherein the first machine learning model may be utilized, for example, for predictive maintenance or for predicting how a batch process will evolve. In particular, the steps of acquiring the first time series of data, processing the first time series of data, and applying process mining may be used for feature engineering, i.e., for determining the input parameters of the first machine learning model.

BRIEF DESCRIPTION OF THE SEVERAL VIEWS OF THE DRAWING(S)

DETAILED DESCRIPTION OF THE INVENTION

Figure 1:
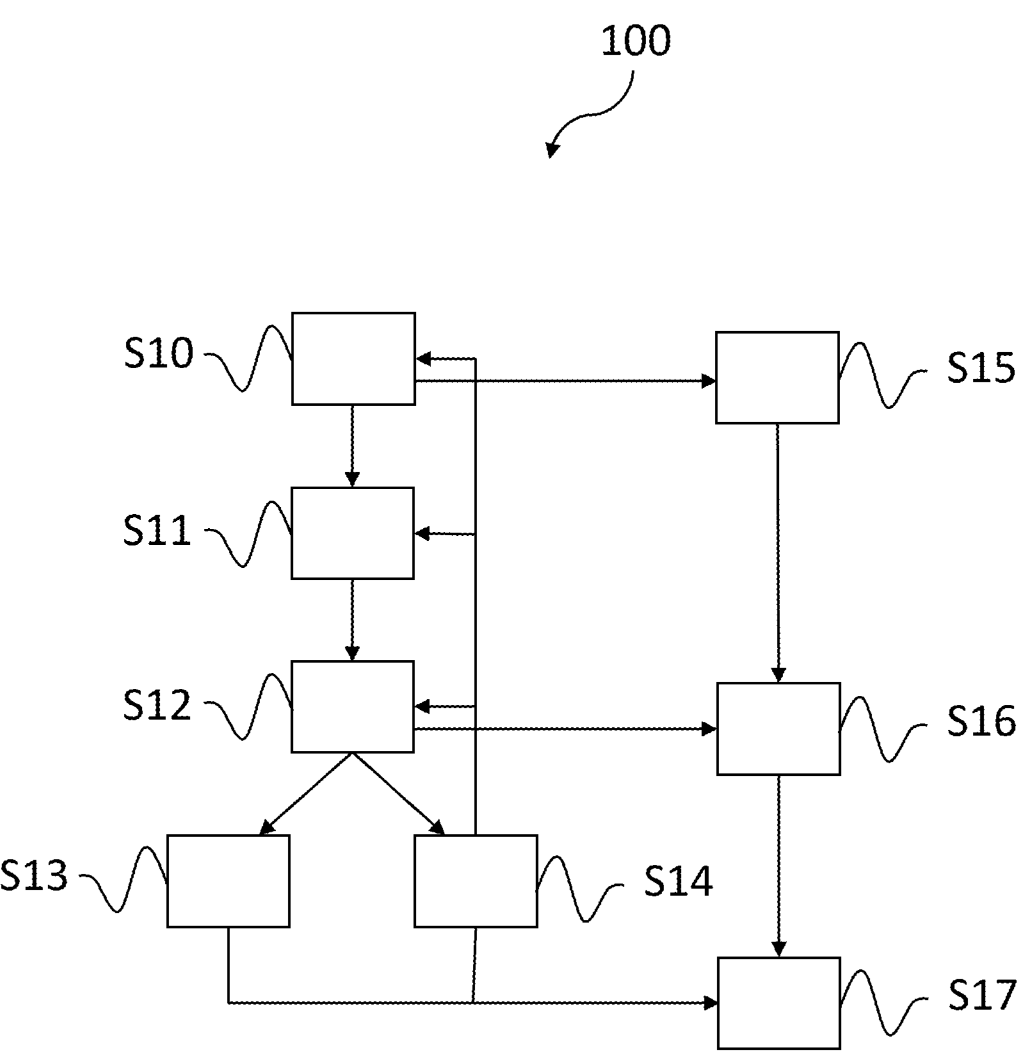
FIG. 1 is a flowchart for a method for automating the development of industrial machine learning applications in accordance with the disclosure.

FIG. 1 shows a method 100 for automating the development of industrial machine learning applications, in particular for predictive maintenance, process monitoring, event prediction, or root-cause analysis.

In step S10, an automated data cleaning algorithm is applied to historical data. Thereto, a machine learning model for data cleaning may be applied. In step S11, labels are determined, which may be performed by a machine learning model for automatic labelling. In the final pre-processing step, step S12, feature engineering is performed by means of process mining. In step S13, a conventional training of a machine learning model is performed. This machine learning model may be configured for applications such as predictive maintenance, process monitoring, event prediction, or root-cause analysis. The training data may comprise or may be based on labels as determined in step S11 and features as determined in step S12.

In step S14, an automated machine learning orchestration is performed for steps S10 to S12. This process is iterative and, depending on the measured performance of the machine learning model obtained from step S13, one or more of the steps S10 to S12 might be revisited. In some embodiments, one or more of the steps S10 to S12 may be performed manually, at least in part, for example the initial data cleaning. The machine learning orchestration may also be performed manually. It is also possible that one or more of the steps S10 to S12 and S14 are skipped, for example the automated data labelling or feature engineering steps.

When the iterations of the machine learning orchestration algorithm end, the final data cleaning algorithm of step S10, the final feature pre-processing algorithm of step S12, and the final machine learning model of step S13 may be provided for the application to new data as illustrated by steps S15 to S17.

In step S15, the final data cleaning algorithm is applied to a live data stream from an industrial installation. In step S16, the final feature determination algorithm is applied to the cleaned data obtained from step S15. In step S17, the trained machine learning model is applied to the features determined in step S16.

The order of the data cleaning, labelling and feature engineering steps S10, S11, and S12, respectively, may be varied in different embodiments.

Figure 2:
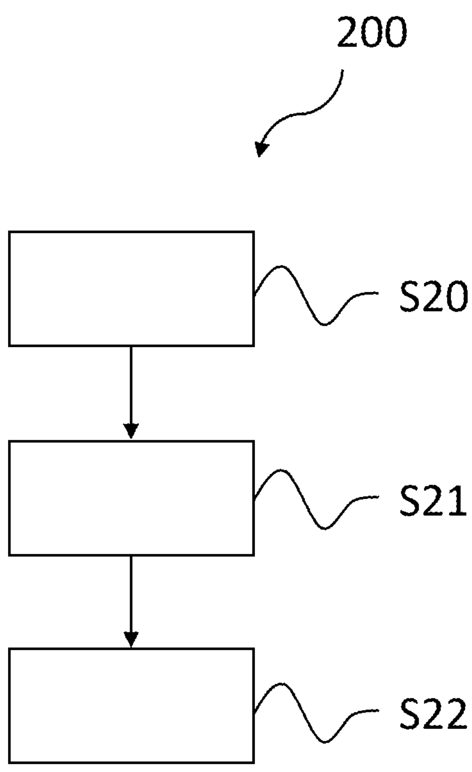
FIG. 2 is a flowchart for a method for training and applying a data cleaning model to achieve an automated data cleaning on raw data received online from an industrial asset in accordance with the disclosure.

FIG. 2 shows a method 200 for training and applying a data cleaning model to achieve an automated data cleaning on raw data received online from an industrial asset. In step S20, raw data from an industrial asset is received and cleaned. Thereby, raw data points in a received raw time series of data may be mapped onto clean data points in a clean time series of data. The mapping from raw data points onto clean data points may be performed manually, at least in part, for example by a machine learning expert. The cleaning of the received raw data may include handling missing values. For example, missing values may be set to the mean of a preceding and a succeeding data point. Furthermore, the cleaning of the received raw data may include removing noise. For example, removing noise may be accomplished by setting data points, which are smaller than a threshold, to zero. Furthermore, the cleaning of the received raw data may include the removal of outliers.

In step S21, the cleaned data points may be used as labels for training a machine learning model for data cleaning. The complete set of raw data is available as regressors. It is also possible that meta-data such as topological connections between measurements or other types of measurements (temperature, level, pressure) is used to select a subset of the complete set of raw data as regressors for a cleaned data point. Thus, a training sample for training the machine learning model for data cleaning may comprise a cleaned data point and a subset of data points of the raw data set. The machine learning model for data cleaning may be trained to predict the value of the cleaned data point from the subset of raw data points in the corresponding training sample. The training of this model may happen in a traditional fashion with manual tuning or automated with concepts like hyper-parameter tuning. The output may be a machine learning model or several machine learning models that are capable to produce a cleaned data point based on a plurality of raw data points.

In step S22, the machine learning model for data cleaning obtained from step S21 may be applied to a data stream from an industrial process, i.e., to a time series of data, cleaning the raw online data and making it suitable as input for subsequent monitoring and/or control models. The output of the monitoring and/or control models may be displayed on a human machine interface (HMI). Additionally or alternatively, the output of the monitoring and/or control models may trigger some actions on the technical system, for instance when used as model in a model predictive controller.

When a sufficient number of training samples for data cleaning is already available from other applications, step S20 may be skipped. Then, the training samples from these other applications may be utilized to train the machine learning model for data cleaning. In this case, human effort for determining training data is no longer required.

Alternatively, a machine learning model for data cleaning may be obtained from other applications.

In an embodiment, even though a sufficient number of training samples for data cleaning or a machine learning model for data cleaning may be available from other applications, a training of an improved machine learning model for data cleaning may be performed. This may involve the labelling of additional raw data points (specifying clean data points) in an active learning process. The active learning process may selectively request labels from a machine learning developer or domain expert to provide further information for the training process.

In another embodiment, hyper-parameter optimization and other AutoML techniques are used in the training process to find the best possible hyper-parameter setting and machine learning model architecture to learn the data cleaning logic.

Figure 3:
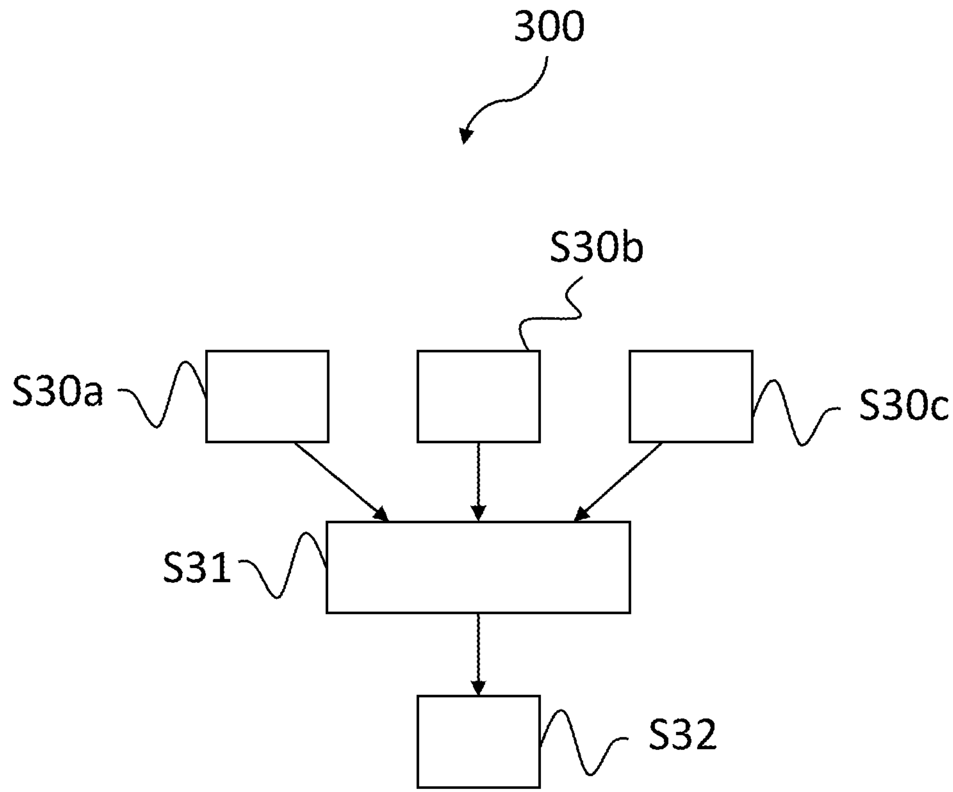
FIG. 3 is a flowchart for a method for automatically determining labels by applying a machine learning model for automatic labelling in accordance with the disclosure.

FIG. 3 shows a method 300 for automatically determining labels using unstructured, semi-structured, or tabular data sources with a timestamp. Example data sources are alarm and/or event lists, shift books, or CMMSs.

In step S30, features are extracted from data entries of different data sources. For example, in step S30*a*, features may be extracted from data entries of a shift book. In step S30*b*, features may be extracted from data entries of an alarm and/or event list. In step S30*c*, features may be extracted from data entries in a CMMS. The extracted features may be typical natural language processing features (e.g. bag-of-words, recognized named entities), but also sentiment analysis or text classifications, statistical figures (alarm rates, # operator actions), quality tests from laboratories, or failure notes on assets in a specific plant area (from CMMS).

The entries of the data sources may have an associated timestamp or may include time information. From the timestamp associated with the entries in the data sources or time information in the entries itself (e.g. time mentioned in the shift book), time-ranges for labelling the process values may be extracted. One challenge with data sources such as shift books, alarm and/or event lists, and CMMSs is that their timestamp cannot be mapped precisely on the timestamp of process values. This issue may be addressed for example by assigning labels with a probability over a time window.

In step S31, the extracted features are used as input into a probabilistic model, e.g. a Bayes network, which may describe a joint probability distribution over the features and the label of interest. For example, the label of interest may indicate an anomaly or normal operation. Given the features, probabilities of label values may be inferred, and a timestamped label may be created by selecting the label with maximum probability.

In step S32, the label determined in step S31 is assigned, for example to a process value, i.e., to a data point of a time series of data, or to a quantity derived from one or more process values such as a condition indicator of an industrial asset. Together with features as determined in step S12 of FIG. 1, the determined label may form a training sample for training the machine learning model of step S14 of FIG. 1.

For each probabilistic model, it is defined, which documents or entries from the data sources are used to generate the input to the probabilistic model and how a time-window (t_start, t_end) is generated for the output label.

In one exemplary embodiment, a probabilistic model might generate a label for a four hour window (t_start=t, t_end=t_start+4 hours), using the alarms and events between t_start and t_end, the shift book entries from t_start to t_start+8 hours (corresponding approximately to one shift) or from t_start until the end of the shift, and the CMMS entries between t_start−12 hours and t_end+12 hours.

The notion of the generated label may not be that the label is probably present during the entire time-window between t_start and t_end, but that the generated label is probably present at least for some time between t_start and t_end.

Figure 4:
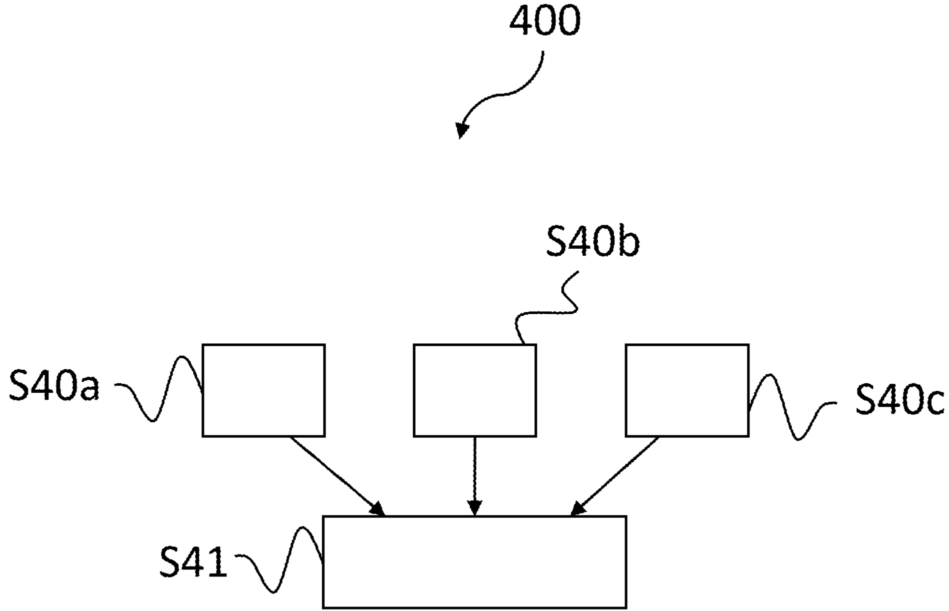
FIG. 4 is a flowchart for a method for training a machine learning model for automatic labelling in accordance with the disclosure.

FIG. 4 shows a method 400 for training a machine learning model for automatic labelling. In step S40, features are extracted from data entries of different data sources. For example, in step S40*a*, features may be extracted from data entries of a shift book. In step S40*b*, features may be extracted from data entries of an alarm and/or event list. In step S40*c*, features may be extracted from data entries in the CMMS. The processing of the data entries in the shift book, the alarm/event list, and the CMMS for extracting features may be similar or identical to that of steps S30*a* to S30*c*.

In step S41, the machine learning model for automatic labelling is trained. The machine learning model for automatic labelling may be a probabilistic model such as a Bayes network. For training the machine learning model for automatic labelling, timestamped labels are used as class labels in a classification process.

The trained probabilistic model may be used in steps S11 and S31 to determine labels for so far unlabelled time windows based on data entries in the shift book, the alarm/event list, and/or the CMMS.

In one embodiment, multiple labels may be determined for each time window and/or process value instead of a single label. Thereto, several probabilistic models may be used, even maybe one probabilistic model per data source, or multiple machine learning models. In this case, algorithms for the implementation of the actual industrial monitoring and/or control task may be used that can handle inconsistent class labels.

Figure 5:
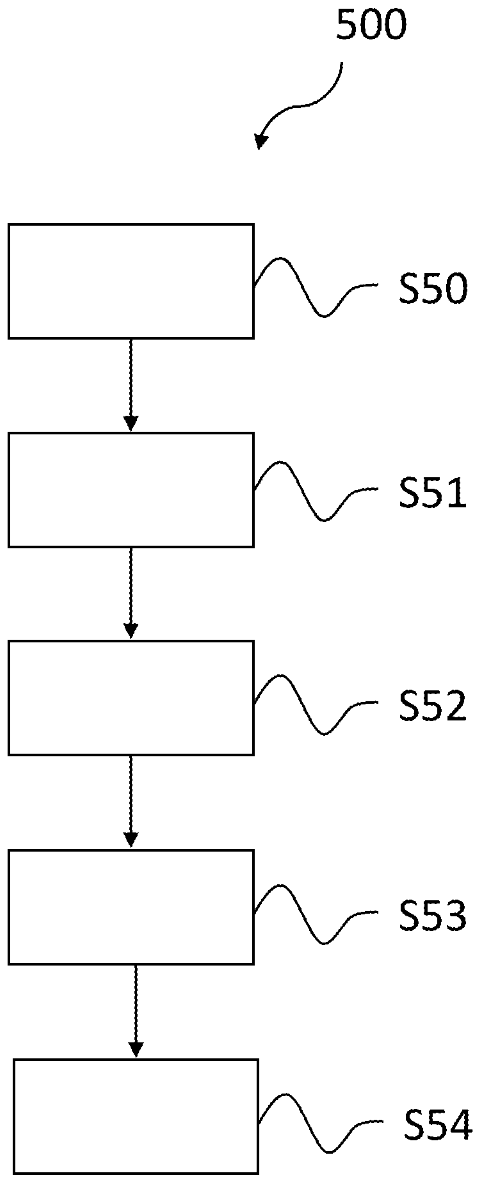
FIG. 5 is a flowchart for a method for performing process mining on a time series of data in accordance with the disclosure.

FIG. 5 shows a method 500 for performing process mining on a time series of data, which may be utilized for feature engineering, in particular for a machine learning model for condition-based monitoring or predictive maintenance for an industrial asset.

Process mining provides the ability to perform conformity analysis. Such conformity reports may be quantified into condition indicators for industrial assets. For example, different types of conformity and thresholds may be used and/or optimized. By calculating these condition indicators periodically (e.g., every second, every minute, every hour, or every day), these metrics can be compared to discover anomalous behavior.

For example, alarms and/or event data from a control system and/or sensor data of an industrial asset such as a motor may be leveraged with the help of process mining to monitor its condition as well as to predict its behavior. This approach is agnostic to the sensor or control system used, i.e., it may be applied separately to other industrial assets and control systems as well (e.g. to robot data), as the normal operation of the asset will be inferred as data is collected over time. In other words, explicit information or a working model is not required to detect anomalies such as a degradation over time.

On reporting an anomaly to a domain expert, explanations for detecting new data as anomalous may easily be provided as the condition indicators as well as actual historical event logs can all be easily retrieved.

In fact, such a methodology need not be limited to condition based monitoring. As more data is collected and used for process mining, this collection of historical data can be continuously used to train machine learning models to make predictions of condition indicators and other statistics (e.g., frequency of occurrence of different events) into the future. For instance, for a batch process, by taking real-time batch data as input, it may be predicted how the process would continue to evolve.

In step S50 of FIG. 5, a time series of data is acquired. This time series may be a raw time series from a sensor of an industrial asset such as a motor or a robot or from a control system such as a distributed or centralized control system for an industrial process or plant. Alternatively, the time series may be a processed time series from a sensor or from a control system. For example, a cleaned time series from a sensor or from a control system may be acquired.

In step S51, the acquired time series of data is encoded using, for example, the symbolic aggregate approximation (SAX) or artificial intelligence techniques. Thereby, the time series of data is transformed into a raw low-level event log, i.e., a set of discrete raw low-level events.

In the optional step S52, relevant events may be extracted from the raw low-level event log. Additionally or alternatively, abstractions may be performed on the raw low-level event log. This may include performing aggregations or filters on the raw low-level event log. For example, a filtering of the raw low-level event log may be performed to remove noise. This may be achieved by setting values below a threshold to zero. Step S52 provides a low-level event log.

In step S53, process mining is applied to the low-level event log to provide conformity analysis and/or bottleneck identification. In particular, bottlenecks in batch processes and/or deviations from standard operating procedures may be discovered.

The process mining in step S53 enables to focus investigations on cases-of-interest. For these cases-of-interest, further data analytics may be performed in step S54. This allows to take contextual information such as the workload of an operator at the time into account, having a closer look at the processes, which deviated from the normal workflow. Consequently, different actions could be taken to improve process efficiency and safety, for example, by providing training to operators, adapting standard operating procedures, etc.

One simple example for how process mining may be applied is the reaction to an alarm. There may be alarms of different priorities. After the activation of an alarm, an acknowledge of an operator may be expected. Furthermore, depending on the alarm priority, an action of the operator may be expected within a time limit, wherein the time limit may depend on the priority of the alarm. If large deviations are detected, for example, when the reaction to a priority 1 alarm occurs more than 5 minutes after the alarm, this may be used to either reprioritize the alarm or to retrain the operators to act faster. Those action sequences with a fast return to normal should become standard responses for the alarm. In other words, the action sequence may be optimized for shortest time to return to normal.

Figure 6:
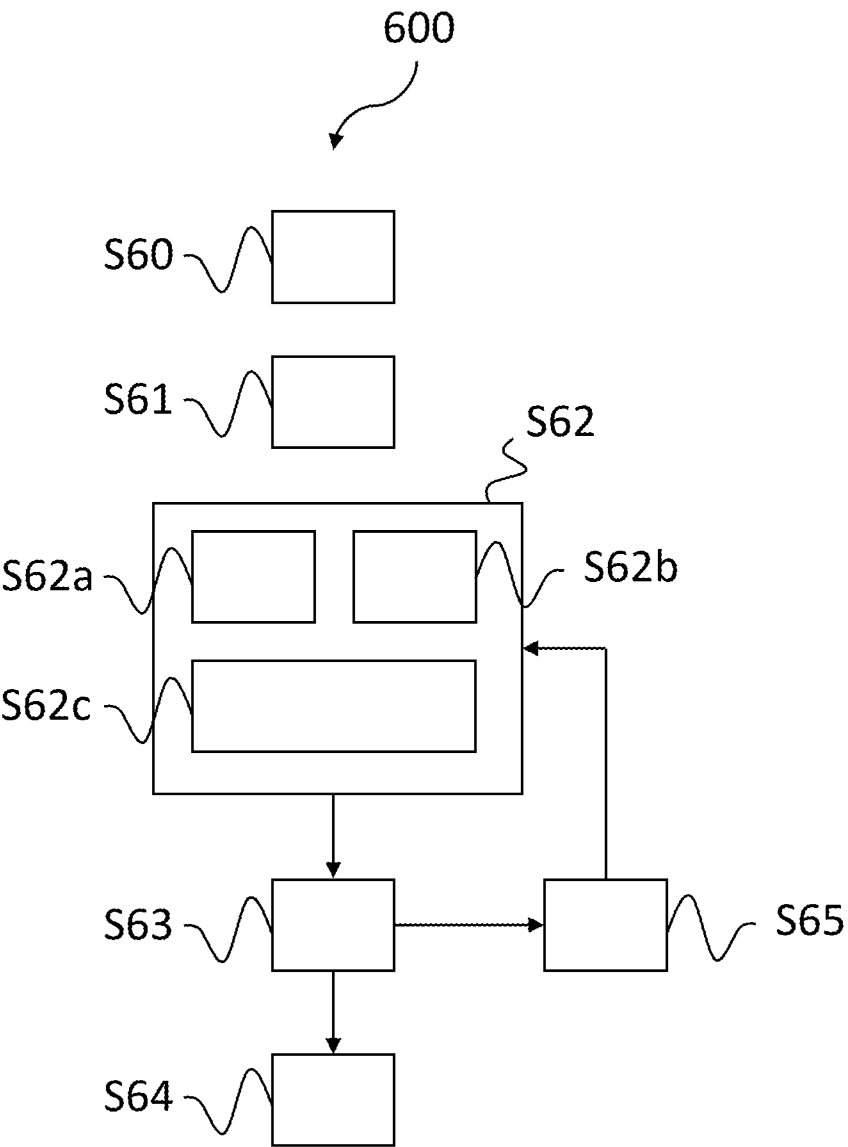
FIG. 6 is a block diagram for a workflow from scenario selection to model export in accordance with the disclosure.

FIG. 6 shows a workflow 600 from scenario selection to model export. In step S60, the scenario is selected. In step S61, data is provisioned. In step S62, a machine learning model is determined with AutoML. This may include the determination of an unsupervised machine learning model with AutoML (step S62*a*), the determination of a supervised machine learning model with AutoML (step S62*b*), and the automated machine learning orchestration by a model manager (step S62*c*).

Starting with raw process/time series data, the method targets two problem classes: Anomaly detection and the segmentation of the time series of data into phases. For both problems, ensembles of unsupervised machine learning models are run to find the best unsupervised machine learning models for both tasks. On top of these results, sequential pattern mining may be applied to derive association rules that may assist with, e.g., root cause analysis. Association rules may help to identify situations, in which, e.g., specific anomalies tend to occur, or in which productivity of the process suffers (e.g., "in 90% of the cases when phase A was shorter than 15 minutes, an anomaly occurred in the subsequent phase").

In step S63, a report is generated. A number of results may be presented to the user: a segmentation of the time series into phases, anomalies within the time series of data, and a list of mined rules/patterns. Confidence thresholds for all results may be selected by the user so that only those results are displayed where the machine learning models are highly confident.

The user can then either export (step S64) the machine learning models for productive use, e.g., for monitoring or troubleshooting, or provide feedback (step S65) to the results: true/false (or more detailed labels) for the detected anomalies, higher/lower granularity (and optionally a label) for the detected phases. Based on the feedback, either the unsupervised machine learning model is improved, or a supervised machine learning model is created with AutoML (step S62*b*), where the results of the unsupervised machine learning model and the user feedback are used to generate the labels. The process may be repeated until the user accepts a machine learning model for export. This can be either a supervised or unsupervised machine learning model.

Figure 7:
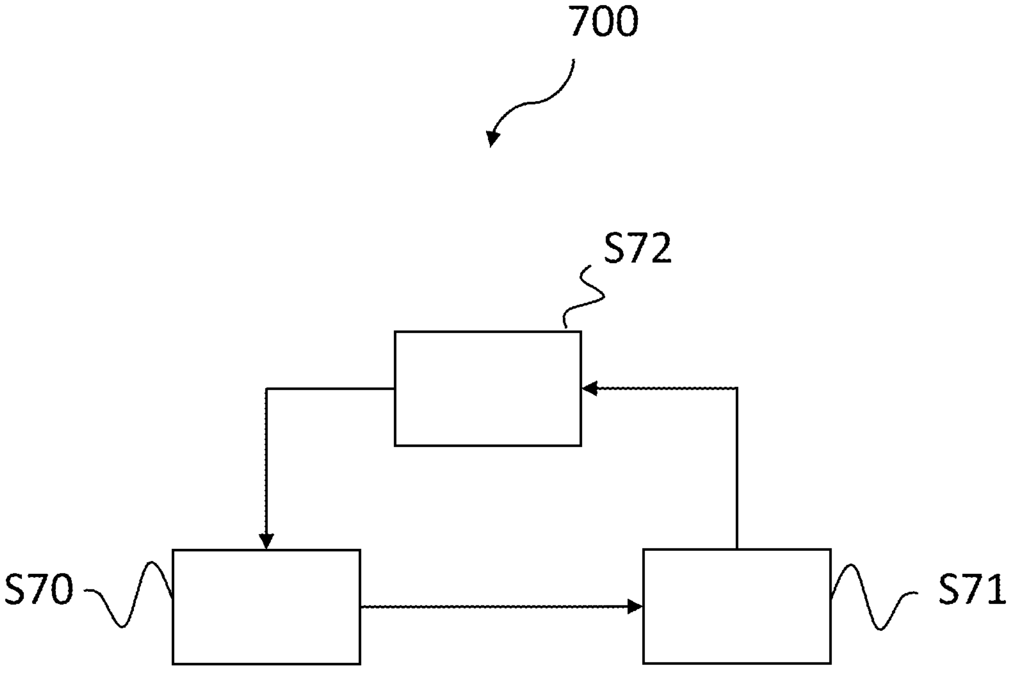
FIG. 7 is a flow diagram for a process to generate unsupervised models for anomaly and process phase detection in accordance with the disclosure.

FIG. 7 illustrates a process 700 to generate unsupervised machine learning models for anomaly and process phase detection. Thus, the process of FIG. 7 may be used for time series segmentation and/or for anomaly detection. In addition, association rules on segments or association rules for anomalies may be derived.

In step S70, a data (pre)processing is performed using for example symbolic aggregate approximation or dynamic time warping. In step S71, a cluster mining is performed, optionally via ensemble learning. In step S72, a model and data stability check is performed.

It is noted that embodiments of the invention are described with reference to different subject matters. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

In an example, the computer-implemented method further comprises determining a condition indicator of the industrial asset based on the conformity analysis and/or bottleneck identification.

The conformity analysis provided by process mining may be quantified into condition indicators for the industrial asset. For example, different types of conformity and thresholds could be used and/or optimized. By calculating these condition indicators periodically (e.g. every second, every minute, every hour, or every day), these metrics can be compared to discover anomalous behavior.

For example, alarms and/or event data from a control system and/or sensor data from a motor, for instance, may be leveraged with the help of process mining to monitor its condition as well as to predict its behavior. This approach is agnostic to the sensor or control system used, i.e., it may be applied separately to other industrial assets and control systems as well, as the normal operation of the asset will be inferred as data is collected over time. In other words, explicit information or a working model is not required to detect anomalies such as a degradation over time.

In an example, the computer-implemented method further comprises training and/or applying a first machine learning model to determine process deviations, to determine potential improvements, to perform condition-based monitoring, to perform predictive maintenance, and/or to predict how a batch process will evolve, wherein input parameters of the first machine learning model are based on the conformity analysis and/or bottleneck identification.

When the first machine learning model is to be trained, the first time series of data may be a time series of data such as a raw or a cleaned training time series of data. In particular, the training time series of data may be a historic time series of data. In contrast, when the first machine learning model is to be applied, the first time series of data may be a life data stream from an industrial asset or from a control system such as a computerized distributed or centralized control system.

The first machine learning model may be trained to determine process deviations, to determine potential improvements, to perform condition-based monitoring, to perform predictive maintenance, and/or to predict how a batch process will evolve.

The input parameters of the first machine learning model may be or may be based on the conformity analysis and/or bottleneck identification. In particular, some or all input parameters of the first machine learning model may be or may be based on condition indicators of the industrial asset derived from the conformity analysis and/or bottleneck identification.

In another example, the processing of the first time series of data to obtain the event log comprises encoding the first time series of data by applying the symbolic aggregate approximation or artificial intelligence techniques.

In order to perform process mining on time series data, it needs to be transformed into an event log, i.e., a set of discrete events. Such encoding may be done using the symbolic aggregate approximation (SAX) or AI techniques.

In another example, the processing of the first time series of data to obtain the event log further comprises performing abstractions on the encoded first time series of data.

Since performing process mining on raw low-level event logs may be difficult, these logs may be transformed by performing abstractions. In one example, this may include aggregating raw low-level events or applying a filter below a threshold. For example, raw low-level events below a threshold may be set to zero to remove noise. Other abstractions of the raw low-level events are possible as well.

In another example, the computer-implemented method further comprises acquiring a second time series of data and cleaning the second time series of data to obtain a third time series of data. Furthermore, a data cleaning machine learning model is trained using a plurality of first training samples, wherein first training samples comprise a clean data point from the third time series of data and a plurality of raw data points from the second time series of data.

Hence, the computer-implemented method may comprise the training of a machine learning model for data cleaning. To train this machine learning model, a set of first training samples may be used, wherein the set of first training samples may be derived from the second and third time series of data.

The second time series of data may be a raw time series of data from the sensor of the industrial asset or from the control system for the industrial process or plant.

The third time series of data may be determined manually, for example by a domain expert or a machine learning expert. The cleaning of the second time series of data to obtain the third time series of data may comprise handling missing values, removing noise, and/or removing outliers.

Different first training samples may comprise different clean data points from the third time series of data. Each of the first training samples may further comprise a plurality of raw data points from the second time series of data. Thereby, raw data points of the second time series of data may be contained in several first training samples. In particular, the first training samples may comprise the raw data points of the second time series of data within a time window, which may be centered on the time of the corresponding clean data point. For training the data cleaning machine learning model, the clean data point of a training sample may serve as desired output of the machine learning model, whereas the raw data points of the training sample serve as input parameters to the machine learning model.

After training the machine learning model for data cleaning, this machine learning model may be applied to a raw time series of data from the sensor of the industrial asset or from the control system to provide a clean time series of data. This clean time series of data may be equal to the first time series of data.

In another example, the computer-implemented method further comprises acquiring a fourth time series of data from the sensor or from the control system and applying a data cleaning machine learning model to the fourth time series of data to obtain the first time series of data.

The data cleaning machine learning model may be trained as described above based on second and third time series of data. This may require the manual determination of the third time series of data, for example by a domain expert.

The fourth time series of data may be different from the second time series of data. In other words, the trained data cleaning machine learning model may be applied to new data, which is not in the training set of first training samples. Thus, the data cleaning machine learning model provides a generalized cleaning logic. In particular, the fourth time series of data may be a live data stream from a sensor or from a control system. The fourth time series of data may comprise thousands of data points per second, which may be cleaned by the data cleaning machine learning model.

It is also possible that the second and third time series of data comprise raw and clean time series of data from other applications, i.e., raw and clean time series of data from other applications may be utilized for training the data cleaning machine learning model. This may reduce or avoid the effort for manually determining clean data points of the third time series of data.

Alternatively, a data cleaning machine learning model from another application may be utilized for cleaning the fourth time series of data.

In another example, a dedicated data cleaning algorithm may be used to clean the fourth time series of data. This dedicated data cleaning algorithm may not be based on a machine learning model. This may be required when the data cleaning machine learning model as determined above does not provide a sufficient data cleaning performance.

In another example, the computer-implemented method further comprises acquiring a first set of labels for training a machine learning model for automatic labelling. Furthermore, one or more data sources are acquired and a first set of features is extracted from the one or more data sources. The machine learning model for automatic labelling may then be trained using a plurality of second training samples, wherein the second training samples comprise a label from the first set of labels and one or more features from the first set of features.

The labels of the first set of labels may have a timestamp. These labels may be used as class labels in a classification process. The labels of the first set of labels may have been determined manually.

The data sources may be unstructured, semi-structured or tabular data sources. Typical examples are alarm and event data, shift book entries, and entries in the computerized maintenance management system (CMMS).

The features extracted from the one or more data sources may comprise typical natural language processing features (e.g. bag-of-words, recognized named entities), but also sentiment analysis or text classifications, statistical figures (alarm rates, # operator actions), quality tests from laboratories, or failure notes on assets in a specific plant area (from CMMS). Quality tests from laboratories may be Boolean values (e.g. in-spec versus out-of-spec) or numerical or categorical quality indicators.

The entries in the data sources may have an associated timestamp, or these entries may comprise time information (e.g. time mentioned in shift book entries). This may be utilized to extract time ranges for labeling process values. One challenge with these data sources is that their timestamp may not match precisely with the timestamp of the process values. This problem may be resolved by assigning labels with a probability over a time window. Here, process values may be data points of the first time series of data. However, also features of the first machine learning problem such as condition indicators of the industrial asset may be assigned the same label as the process values that they are derived from.

The machine learning model for automatic labelling may be a probabilistic network/model such as a Bayes network. Thus, the features of the first set of features may be used as input into a probabilistic model, which describes a joint probability distribution over the features and the label of interest (e.g. normal vs. anomalous operation).

For each probabilistic model, it may be defined, which documents or entries from the data sources are used to generate the input to the probabilistic model and how a time-window (t_start, t_end) is generated for the output label. For instance, a probabilistic model might generate a label for a four-hour (4 h) window from t_start to t_end=t_start+4 h. Thereby, alarms and events between, for example, t_start and t_end may be used. Additionally or alternatively, shift book entries between, for example, t_start and t_start+8 h (corresponding approximately to one shift) may be used, or shift book entries from t_start until the end of the shift. Additionally or alternatively, CMMS data between, for example, t_start−12 h and t_start+12 h may be used.

The notion of the label generated by the machine learning model for automatic labelling may not be that the label is probably present during the entire time-window between t_start and t_end, but that the label is probably present at least for some time between t_start and t_end.

After training the machine learning model for automatic labelling, the model may be used to label so far unlabeled time windows based on the corresponding data in the shift book, the alarm list, the event list, and/or the CMMS.

In another example, the computer-implemented method further comprises extracting a second set of features from the one or more data sources and determining a second set of labels by applying the machine learning model for automatic labelling to features from the second set of features.

The second set of features may be extracted from later entries of the data sources as compared to the first set of features. It is also possible that there is an overlap, so some entries of the data sources may be used for extracting features of both the first and second sets of features.

Given features from the second set of features, the probabilities of the label values may be inferred by means of the machine learning model for automatic labelling. Hence, a timestamped label of the second set of labels may be determined by selecting the label value with maximal probability. This may be utilized to label historical processes with labels from the second set of labels.

In another example, multiple labels may be assigned to a process value instead of a single label. Thereto, multiple machine learning models such as multiple probabilistic models may be used. For example, one probabilistic model per data source may be used. Furthermore, algorithms for the implementation of the actual industrial monitoring and control task may be used, which may be configured to handle inconsistent class labels.

In another example, the first machine learning model is trained using a plurality of third training samples, wherein a third training sample comprises a label from the first or second sets of labels and/or the condition indicator of the industrial asset.

More specifically, for the training of the first machine learning model, labels of the first and/or second sets of labels may be utilized as desired output values of the first machine learning model. Furthermore, condition indicators of the industrial asset may be utilized as input values of the first machine learning model.

According to the present disclosure, also a data processing system is presented. The data processing system is configured to carry out the steps of any of the methods according to the present invention.

The data processing system may comprise a storage medium for storing amongst others, the first, second, third, and/or fourth time series of data. The data processing system may further comprise a processor such as a micro-processor with one or more processor cores. In addition, the data processing system may comprise a graphics processing unit, which may be used for efficiently training the first machine learning model, the machine learning model for data cleaning, and/or the machine learning model for automatic labelling. The data processing system may also comprise communication means such as LAN, WLAN, or cellular communication modems. The data processing system may be connected to the sensor of the industrial asset or to the control system of the industrial process or plant via communication means. The data processing system may further be connected to one or more servers, which may store training samples, or which may execute one or more steps of the computer-implemented method such as the training of the first machine learning model, the machine learning model for data cleaning, and/or the machine learning model for automatic labelling. Furthermore, the data processing system may comprise peripherals such as screens.

According to the present disclosure, also a computer program is presented, wherein the computer program comprises instructions to cause the data processing system as defined in the independent claims to execute any one of the methods according to the present invention when the computer program is run on the data processing system.

According to the present disclosure, also a computer-readable medium is presented, wherein the computer-readable medium stores the computer program as defined in the independent claims.

It shall be understood that the computer-implemented method for machine learning, the data processing system configured to carry out the steps of the method, the computer program for causing the data processing system to execute the method, and the computer readable medium having stored such computer program have similar and/or identical preferred embodiments, in particular, as defined in the dependent claims. It shall be understood further that a preferred embodiment of the invention can also be any combination of the dependent claims with the respective independent claim.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for developing a machine learning model for an industrial asset, the method comprising:

acquiring a first time series of data from a sensor of an industrial asset;

processing the first time series of data to obtain an event log, wherein processing the first time series of data comprises encoding the time series of data into discrete events associated with a change in a state of the industrial asset;

applying process mining to the event log to provide a bottleneck identification, the bottleneck identification comprising bottlenecks in batch processes and deviations from standard operating procedures of the industrial asset;

applying the process mining to the event log to provide conformity analysis relative to a learned normal operation of the industrial asset;

continuously determining a condition indicator of the industrial asset based on the conformity analysis and the bottleneck identification, wherein the condition indicator indicates a deviation of performance of the industrial asset from a baseline;

developing a first machine learning model to monitor the industrial asset with the continuously determined condition indicator being an input parameter of the first machine learning model; and applying the first machine learning model to determine potential improvements, to perform condition-based monitoring, and/or to perform predictive maintenance of the industrial asset.

2. The computer-implemented method of claim 1, wherein applying the first machine learning model further includes to determine process deviations and/or to predict how a batch process will evolve.

3. The computer-implemented method of claim 1, wherein the processing of the first time series of data to obtain the event log comprises encoding the first time series of data by applying symbolic aggregate approximation or artificial intelligence techniques.

4. The computer-implemented method of claim 3, wherein the processing of the first time series of data to obtain the event log further comprises performing abstractions on the encoded first time series of data.

5. The computer-implemented method of claim 4, wherein the abstractions performed on the encoded first time series of data comprise data aggregations and/or noise suppression filters.

6. The computer-implemented method of claim 1, further comprising:

acquiring a second time series of data;

cleaning the second time series of data to obtain a third time series of data; and training a data cleaning machine learning model using a plurality of first training samples;

wherein a first training sample comprises a clean data point from the third time series of data and a plurality of raw data points from the second time series of data.

7. The computer-implemented method of claim 6, wherein the cleaning of the second time series of data comprises handling missing values, removing noise, and/or removing outliers.

8. The computer-implemented method of claim 1, further comprising:

acquiring a fourth time series of data from the sensor or from a control system associated with the industrial asset; and applying a data cleaning machine learning model to the fourth time series of data to obtain the first time series of data.

9. The computer-implemented method of claim 1, further comprising:

acquiring a first set of labels for training a machine learning model for automatic labelling;

acquiring one or more data sources;

extracting a first set of features from the one or more data sources; and training the machine learning model for automatic labelling using a plurality of second training samples;

wherein a second training sample comprises a label from the first set of labels and one or more features from the first set of features.

10. The computer-implemented method of claim 9, wherein the one or more data sources comprise at least one of a shift book, an alarm list, an events list, and/or a data source from a computerized maintenance management system; and/or wherein the machine learning model for automatic labelling is a probabilistic model.

11. The computer-implemented method of claim 9, further comprising:

extracting a second set of features from the one or more data sources; and applying the machine learning model for automatic labelling to features from the second set of features to obtain a second set of labels.

12. The computer-implemented method of claim 9, wherein the first machine learning model is trained using a plurality of third training samples; and wherein a third training sample comprises a label from the first or second sets of labels and/or the condition indicator of the industrial asset.

13. The computer-implemented method of claim 1 wherein acquiring the first time series of data further includes acquiring data from a control system associated with the industrial asset.

* * * * *